United States Patent
Hou et al.

(10) Patent No.: US 11,104,035 B1
(45) Date of Patent: Aug. 31, 2021

(54) MIXER DRUM DRIVE WITH VARIABLE DISPLACEMENT MOTOR

(71) Applicant: Oshkosh Corporation, Oshkosh, WI (US)

(72) Inventors: Yanming Hou, Oshkosh, WI (US);
Loren G. DeVries, Oshkosh, WI (US);
Rongjun Zhang, Oshkosh, WI (US);
Jeremy Andringa, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 373 days.

(21) Appl. No.: 16/051,979

(22) Filed: Aug. 1, 2018

Related U.S. Application Data

(60) Provisional application No. 62/542,553, filed on Aug. 8, 2017.

(51) Int. Cl.
*B28C 5/00* (2006.01)
*B28C 5/42* (2006.01)
*F15B 11/17* (2006.01)
*F15B 7/00* (2006.01)

(52) U.S. Cl.
CPC .......... *B28C 5/4213* (2013.01); *B28C 5/4217* (2013.01); *F15B 11/17* (2013.01); *F15B 7/006* (2013.01); *F15B 2211/20515* (2013.01); *F15B 2211/20523* (2013.01); *F15B 2211/20538* (2013.01); *F15B 2211/20576* (2013.01); *F15B 2211/327* (2013.01)

(58) Field of Classification Search
CPC ..... B28C 5/4213; B28C 5/4217; F15B 11/17; F15B 7/006; F15B 2211/20515; F15B 2211/20523; F15B 2211/20538; F15B 2211/20576; F15B 2211/327
See application file for complete search history.

(56) References Cited

U.S. PATENT DOCUMENTS

| | | | |
|---|---|---|---|
| 1,355,478 A | 10/1920 | Hudson | |
| 3,918,311 A * | 11/1975 | Maier | B28C 5/4227 74/37 |
| 4,362,390 A | 12/1982 | Fischer | |
| 5,033,863 A | 7/1991 | Linkletter | |
| 5,667,298 A | 9/1997 | Musil et al. | |

(Continued)

FOREIGN PATENT DOCUMENTS

| | | |
|---|---|---|
| GB | 0 983 100 A | 2/1965 |
| GB | 1 031 382 A | 6/1966 |

*Primary Examiner* — Anshu Bhatia
(74) *Attorney, Agent, or Firm* — Foley & Lardner LLP

(57) ABSTRACT

A vehicle includes an engine, a drum, a drum drive system, and a control system coupled to the engine and the drum drive system. The drum drive system includes a pump and a motor. The pump is mechanically coupled to the engine and configured to pump a fluid through a hydraulic system. The pump has a variable pump displacement. The motor is fluidly coupled to the pump by the hydraulic system and positioned to drive the drum to agitate the drum contents. The motor has a variable motor displacement. The control system is configured to receive pressure data indicative of a pressure of the fluid within the hydraulic system, reduce the variable motor displacement in response to the pressure of the fluid being less than a threshold system pressure, and reduce a speed of the engine based on the reduction of the variable motor displacement.

18 Claims, 5 Drawing Sheets

(56) References Cited

U.S. PATENT DOCUMENTS

| | | | |
|---|---|---|---|
| 5,676,460 | A | 10/1997 | Biberstine et al. |
| 5,740,044 | A | 4/1998 | Ehrenhardt et al. |
| 6,074,083 | A | 6/2000 | Gebhard et al. |
| 6,497,531 | B2 | 12/2002 | Sipherd et al. |
| 7,467,889 | B2 | 12/2008 | Abe et al. |
| 7,866,875 | B2 | 1/2011 | Abe et al. |
| 7,900,446 | B2 | 3/2011 | Geissler et al. |
| 8,616,758 | B2 | 12/2013 | Takahashi |
| 8,926,164 | B2 | 1/2015 | Kamijo |
| 9,551,385 | B2 | 1/2017 | Takahashi et al. |
| 2009/0238026 | A1 | 9/2009 | Johnson |
| 2014/0198599 | A1* | 7/2014 | Kamijo ................ B28C 5/422 366/61 |
| 2015/0047335 | A1 | 2/2015 | Takahashi |

* cited by examiner

MIXER DRUM DRIVE WITH VARIABLE DISPLACEMENT MOTOR

CROSS-REFERENCE TO RELATED PATENT APPLICATIONS

This application claims the benefit of U.S. Provisional Patent Application No. 62/542,553, filed Aug. 8, 2017, which is incorporated herein by reference in its entirety.

BACKGROUND

Concrete mixer vehicles are configured to receive, mix, and transport wet concrete or a combination of ingredients that when mixed form wet concrete to a job site. Concrete mixing vehicles include a rotatable mixing drum that mixes the concrete disposed therein.

SUMMARY

One embodiment relates to a vehicle. The vehicle includes an engine, a drum configured to mix drum contents received therein, a drum drive system coupled to the drum and the engine, and a control system coupled to the engine and the drum drive system. The drum drive system includes a pump and a motor. The pump is mechanically coupled to the engine and configured to pump a fluid through a hydraulic system. The pump has a variable pump displacement. The motor is fluidly coupled to the pump by the hydraulic system and positioned to drive the drum to agitate the drum contents. The motor has a variable motor displacement. The control system is configured to receive a target speed for the drum, receive pressure data indicative of a pressure of the fluid within the hydraulic system, reduce the variable motor displacement in response to the pressure of the fluid being less than a threshold system pressure, and reduce a speed of the engine based on the reduction of the variable motor displacement, while maintaining the target speed for the drum.

Another embodiment relates to a method for controlling a drum drive system of a mixer vehicle. The method includes operating, by a control system, an engine, a variable displacement motor, and a variable displacement pump to provide a target drum speed. The variable displacement pump is selectively mechanically coupled to the engine such that a pump speed of the variable displacement pump is based on an engine speed of the engine. The variable displacement motor is fluidly coupled to the variable displacement pump such that a motor speed of the variable displacement motor is based on a flow of a fluid received from the variable displacement pump. The variable displacement motor is positioned to drive a mixing drum at the target drum speed. The method further includes monitoring, by the control system, pressure data acquired by a pressure sensor indicative of a pressure of the flow of the fluid. The method further includes, in response to the pressure of the flow of the fluid being below a threshold pressure and a transmission of the mixer vehicle being in neutral, and while maintaining the target drum speed of the mixing drum: (i) decreasing, by the control system, the engine speed of the engine, which thereby decreases the pump speed of the variable displacement pump, (ii) increasing, by the control system, a pump displacement of the variable displacement pump, and (iii) decreasing, by the control system, a motor displacement of the variable displacement motor.

Still another embodiment relates to a drum drive system for a mixer vehicle. The drum drive system includes a variable displacement pump, a variable displacement motor, and a controller. The variable displacement pump is selectively mechanically couplable to an engine such that a pump speed of the variable displacement pump is based on an engine speed of the engine. The variable displacement motor is fluidly coupled to the variable displacement pump such that a motor speed of the variable displacement motor is based on a flow of a fluid received from the variable displacement pump. The variable displacement motor is configured to drive a mixing drum at a target drum speed. The controller is configured to selectively control the engine, the variable displacement pump, and the variable displacement motor to provide the target drum speed. To provide the target drum speed, the controller is configured to: (i) initially operate the variable displacement motor at a maximum motor displacement and operate the variable displacement pump at a pump displacement that provides the target drum speed without needing to actively manipulate the engine speed, (ii) increase the pump displacement and decrease a motor displacement without needing to actively manipulate the engine speed while still providing the target drum speed, and (iii) increase the engine speed in response to the pump displacement reaching a maximum pump displacement and the motor displacement reaching a minimum motor displacement if necessary to maintain the target drum speed.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
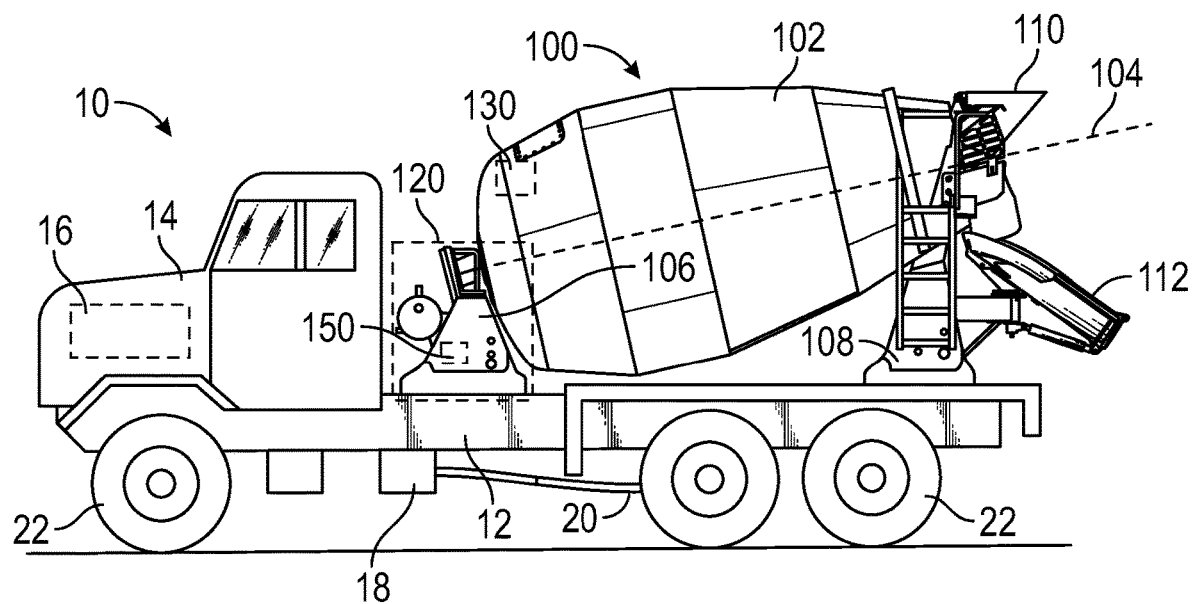
FIG. 1 is a side view of a concrete mixing truck with a drum assembly and a control system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a concrete mixing vehicle includes a drum assembly having a mixing drum, a drum drive system, and a drum control system. The drum control system may be configured to control the drum drive system to rotate the mixing drum at a target speed. According to an exemplary embodiment, the drum drive system is a hydraulic drum drive system having two degrees of freedom. By having a drum drive system with a second degree of freedom, the drum drive system facilitates optimizing, balancing, and synchronizing the speed, the torque, and the load of critical components of the drum drive system. The drum drive system of the present disclosure may advantageously minimize energy consumption or waste, reduce noise and emissions, and optimize component working life relative to a single degree of freedom drum drive system. The two degree of freedom drum drive system therefore provides a system that delivers better fuel consumption, optimal system life, and friendlier working environment. While the drum drive system is described herein as a drum drive system for a concrete mixer truck, the drum drive system may be applied to any vehicles having similar accessory drive configurations.

A drum drive system typically includes a hydrostatic drive that functions as both the power source and the speed control device for drum drives. Hydrostatic drives may offer fast response, can maintain precise speed under varying loads, and allow continuously variable speed ratio control. A basic hydrostatic drive is a complete closed loop hydraulic circuit containing a pump and a motor. The pump of the hydrostatic drive is typically a reversible variable-displacement pump. The pump may be coupled to and driven by a power-take-off ("PTO") shaft coupled to an engine of the vehicle. The motor is conventionally a fixed displacement motor. The motor may be coupled to the drum through a ratio reduction gearbox, pulley system, or otherwise coupled thereto. The pump may include a built-in device to adjust the pump displacement and flow direction.

The drum assembly may be operable in multiple working modes. The drum may be operated through a wide speed range, from lower than 1 revolution-per-minute ("rpm") in a transportation mode (e.g., while the vehicle is moving, etc.) to above 18 rpm in a loading mode and/or a mixing mode. While in a discharging mode, it may be desirable to have the lowest possible drum speed to achieve accurate discharging. The mixing mode of the drum may require the hydrostatic drive to provide a speed range over 20:1 (e.g., the highest speed of the drum divided by the lowest speed of the drum, etc.). The max speed range of a standard hydrostatic pump is about 10:1 due to maximum pump displacement, pressure limit, and/or torque limit thereof. A fixed displacement motor has a fixed speed and therefore the speed range thereof is fixed (e.g., 1:1, etc.) based on the pump output provided thereto. Therefore, the engine has to run over its full speed range (approximately 3:1) to meet application requirements for the mixing mode. In the loading mode and/or the mixing mode, the engine speed will typically run at the high idle (up to maximum governed speed). In the discharging mode, the engine may run near the low idle or independent of drum operation if the vehicle is being driven.

The limited speed ratio range of a typical hydrostatic drive presents severe drawbacks in concrete mixing. Mixer vehicle have engines that are sized mainly for acceleration and climbing the most severe uphill grades at maximum load. In concrete mixing operations, the required power is typically about one third of the engine capacity. Running at high idle results in poor fuel efficiency. Other than unnecessary fuel consumption, more emissions, more noise, and reduced engine life are all byproducts. Another issue is the accuracy of concrete discharging. Some applications prefer slow and accurate discharging rate. The engine may thereby be run at low idle to provide a flow discharge rate of mixture from the drum. However, the engine torque capacity becomes very weak at low idle and any load change causes engine speed fluctuations, which negatively affects the discharging accuracy.

According to an exemplary embodiment, the drum drive system of the present disclosure replaces the conventional fixed displacement motor with a variable displacement motor. The variable displacement motor may provide a speed range of 3:1 or 4:1. The speed range of the drum drive system is a product of the pump speed range multiplied by the motor speed range. With a fixed displacement motor, the speed range of the drum drive system is the speed ratio of the variable pump, typically around 10:1. The drum drive system with the variable displacement motor may have a speed range that reaches up to 30:1 or 40:1. The increased speed range of the drum drive system having a variable displacement motor relative to a drum drive system having a fixed displacement motor frees up boundary limits for the engine, the pump, and the motor. Advantageously, with the increased capacity of the drum drive system, the engine does not have to run at either high idle or low idle, but rather may operate at a speed that provides the most fuel efficiency and most stable torque. Also, the pump and the motor do not have to go to displacement extremes to meet the speed requirements of various applications, but can rather be modulated to the most efficient working conditions. The drum drive system of the present disclosure may provide a desirable maximum overall drive ratio relative to traditional arrangements. The maximum overall drive ratio may be the ratio of the engine speed to the drum speed and may vary based on the maximum pump displacement, the minimum motor displacement, and/or the gearbox ratio. The maximum overall drive ratio may be limited in conventional systems to prevent drum over speed at elevated (e.g., the highest possible, etc.) engine speed. In conventional systems, the maximum overall drive ratio may be 120:1 (e.g., an engine speed of 2,100 rpm may provide a drum speed of 18 rpm at full pump displacement, etc.). The motor of the present disclosure may have a 3:1-4:1 reduction (e.g., at 100% to 33-25% displacement, etc. 2) and facilitate providing an overall drive ratio of 30:1-40:1. The motor of the present disclosure may facilitate providing maximum drum speed at or near engine idle speed. In one embodiment, traditional engine idle speed variation is displaced by motor displacement variation.

Since the early application of hydrostatic drives, manual pump adjustment has been the main method of drum speed control. Adding the control and adjustment of the variable displacement motor not only doubles the operator demands, it also introduces risks of over speeding the motor, over speeding the drum, and over pressurizing the system. It is beyond a capacity of a human operator and a traditional mixer vehicle control system to control pump displacement, motor displacement, and engine speed at the same time and guarantee the pressures and speeds are all within target operating ranges. The drum control system of the present disclosure is more sophisticated relative to those of traditional mixer vehicles (e.g., those having fixed-displacement motors, etc.). The drum control system may be configured to control pump displacement and motor displacement while continuously electronically controlling the engine speed (e.g., when the concrete mixing vehicle is not being driven, etc.). To facilitate such control, the drum control system is configured to monitor the working pressure on both sides of the motor and the pump, motor speed (i.e., which is proportional to the drum speed), engine speed, engine torque, and/or percent load. By way of example, when the operator specifies a desired drum speed, the drum control system may be configured to regulate the engine speed, pump displacement, and motor displacement. The drum control system may be configured to maintain the engine speed at the lowest required level while controlling pump displacement and motor displacement to provide the required power demand to operate the drum at the desired drum speed. In other embodiments, engine speed is not varied. In still other embodiments, the drum control system reduces the risk of system over pressure and/or drum over speed, improving fuel economy by using lower engine speeds, in response to independently controlled pump displacement and/or flow and independently controlled engine speed. Such independent pump control may be facilitated by way of a manual cable control, a manual analog control, or a manual electronic control. Such independent drum speed control may be facilitated by way of a PTO speed controller.

According to the exemplary embodiment shown in FIGS. 1-4, a vehicle, shown as concrete mixing truck 10, includes a drum assembly, shown as drum assembly 100. According to an exemplary embodiment, the concrete mixing truck 10 is configured as a rear-discharge concrete mixing truck. In other embodiments, the concrete mixing truck 10 is configured as a front-discharge concrete mixing truck. As shown in FIG. 1, the concrete mixing truck 10 includes a chassis, shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixing truck 10 by an operator (e.g., a seat, a steering wheel, hydraulic controls, a user interface, switches, buttons, dials, etc.).

Figure 3:
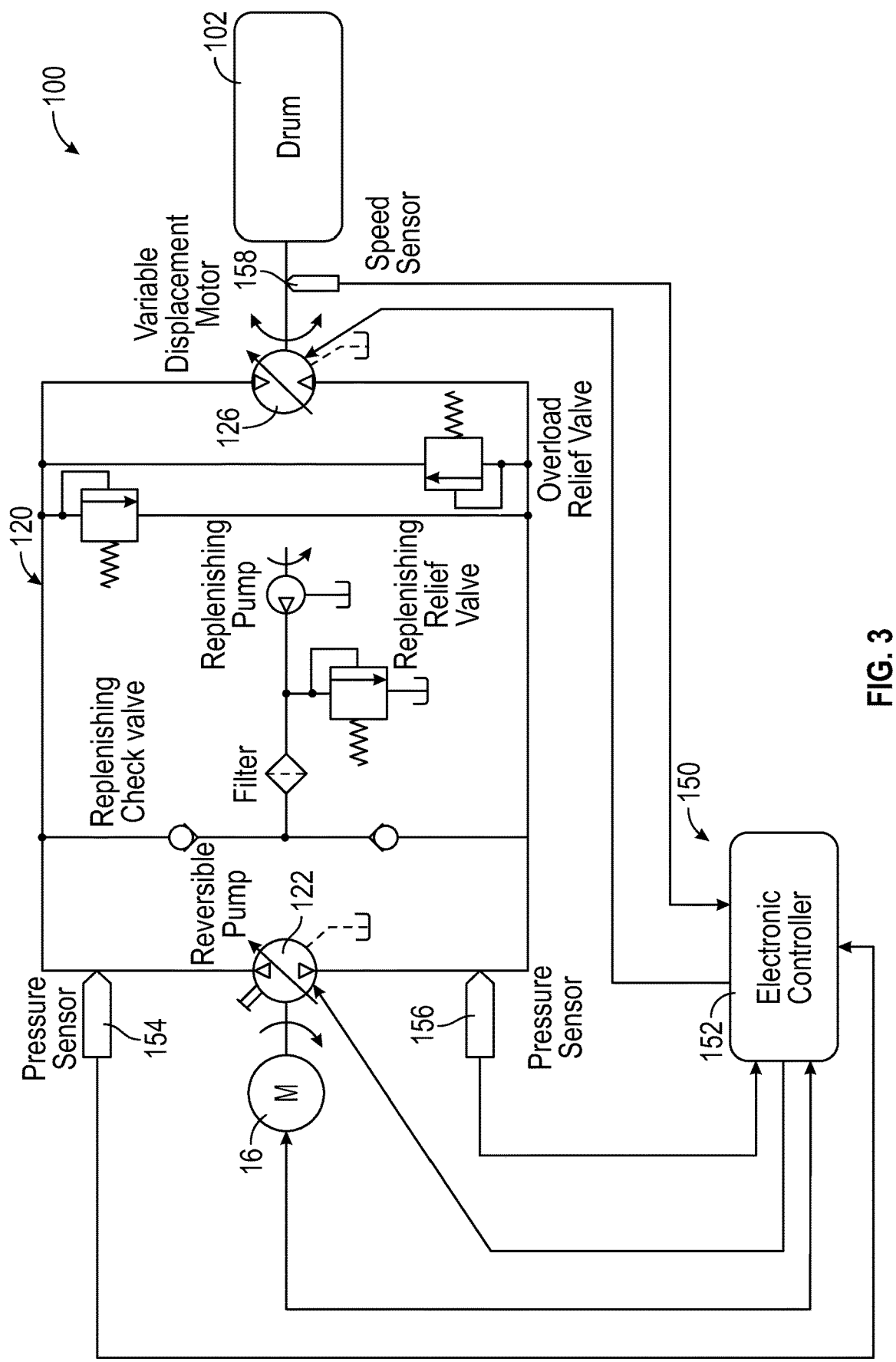
FIG. 3 is a schematic diagram of a drum drive system of the concrete mixing truck of FIG. 1, according to an exemplary embodiment.
Figure 4:
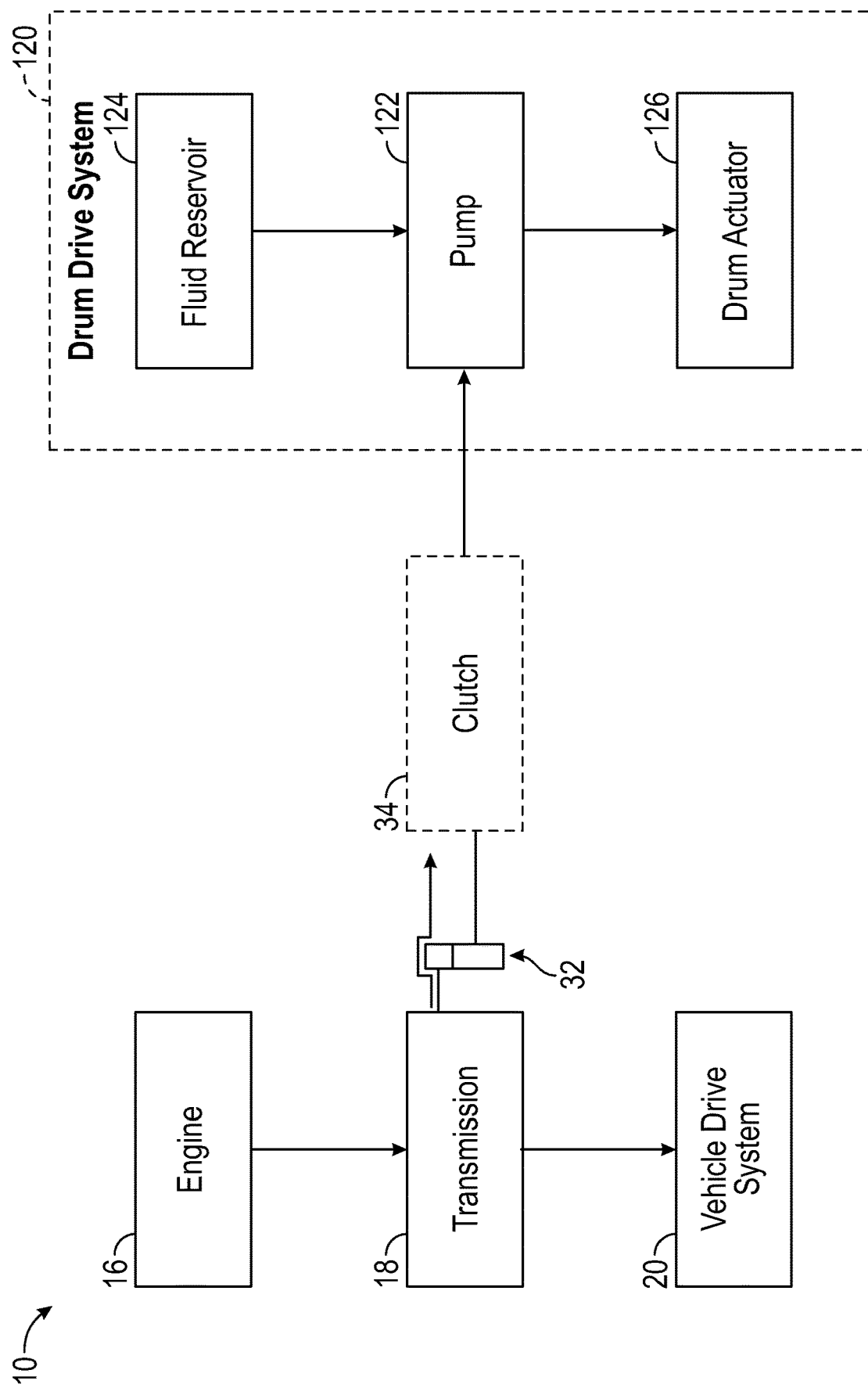
FIG. 4 is a power flow diagram for the concrete mixing truck of FIG. 1 having a drum drive system that is selectively coupled to a transmission with a clutch, according to an exemplary embodiment.

As shown in FIGS. 1, 3, and 4, the concrete mixing truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

As shown in FIGS. 1 and 4, the concrete mixing truck 10 includes a power transfer device, shown as transmission 18. In one embodiment, the engine 16 produces mechanical power (e.g., due to a combustion reaction, etc.) that flows into the transmission 18. As shown in FIGS. 1 and 4, the concrete mixing truck 10 includes a first drive system, shown as vehicle drive system 20, that is coupled to the transmission 18. The vehicle drive system 20 may include drive shafts, differentials, and other components coupling the transmission 18 with a ground surface to move the concrete mixing truck 10. As shown in FIG. 1, the concrete mixing truck 10 includes a plurality of tractive elements, shown as wheels 22, that engage a ground surface to move the concrete mixing truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

Figure 2:
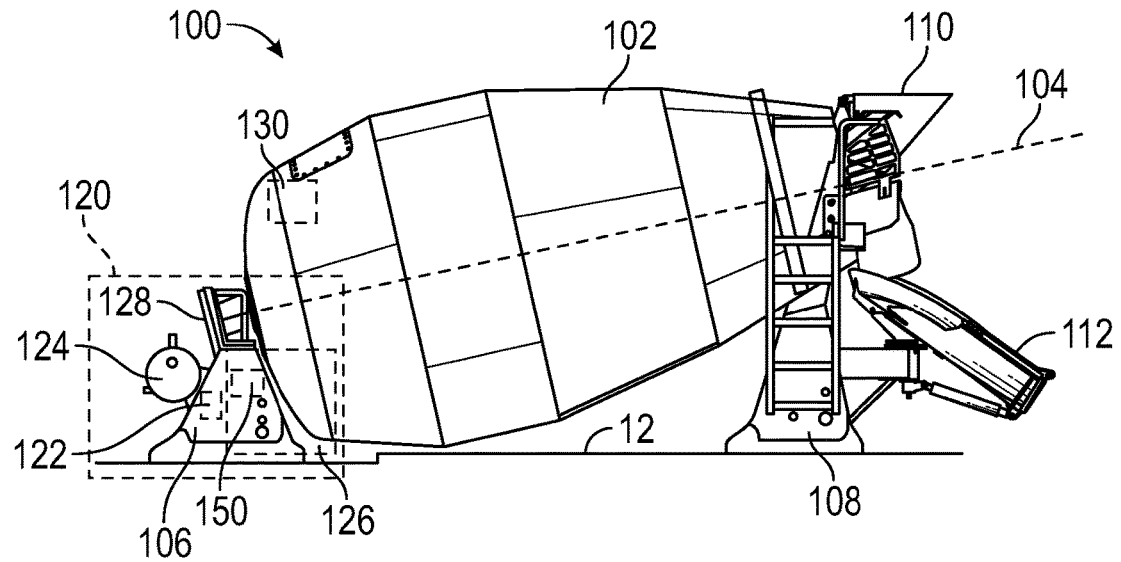
FIG. 2 is a detailed side view of the drum assembly of the concrete mixing truck of FIG. 1, according to an exemplary embodiment.

As shown in FIGS. 1-3, the drum assembly 100 of the concrete mixing truck 10 includes a drum, shown as mixing drum 102. The mixing drum 102 is coupled to the frame 12 and disposed behind the cab 14 (e.g., at a rear and/or middle of the frame 12, etc.). As shown in FIGS. 1-4, the drum assembly 100 includes a second drive system, shown as drum drive system 120, that is coupled to the frame 12. As shown in FIGS. 1 and 2, the concrete mixing truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixing drum 102 to the frame 12 and facilitate rotation of the mixing drum 102 relative to the frame 12. In an alternative embodiment, the drum assembly 100 is configured as a stand-alone mixing drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIGS. 1 and 2, the mixing drum 102 defines a central, longitudinal axis, shown as axis 104. According to an exemplary embodiment, the drum drive system 120 is configured to selectively rotate the mixing drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixing drum 102 of the drum assembly 100 includes an inlet, shown as hopper 110, and an outlet, shown as chute 112. According to an exemplary embodiment, the mixing drum 102 is configured to receive a mixture, such as a concrete mixture (e.g., cementitious material, aggregate, sand, etc.), with the hopper 110. As shown in FIGS. 1 and 2, the mixing drum 102 includes a port, shown as injection port 130. The injection port 130 may provide access into the interior of the mixing drum 102 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port 130 includes an injection valve that facilitates injecting the water and/or the chemicals from a fluid reservoir (e.g., a water tank, etc.) into the mixing drum 102 to interact with the mixture, while preventing the mixture within the mixing drum 102 from exiting the mixing drum 102 through the injection port 130. In some embodiments, the mixing drum 102 includes multiple injection ports 130 (e.g., two injection ports, three injection ports, etc.) configured to facilitate independently injecting different water and/or chemicals into the mixing drum 102. The mixing drum 102 may include a mixing element (e.g., fins, etc.) positioned within the interior thereof. The mixing element may be configured to (i) agitate the contents of mixture within the mixing drum 102 when the mixing drum 102 is rotated by the drum drive system 120 in a first direction (e.g., counterclockwise, clockwise, etc.) and (ii) drive the mixture within the mixing drum 102 out through the chute 112 when the mixing drum 102 is rotated by the drum drive system 120 in an opposing second direction (e.g., clockwise, counterclockwise, etc.).

As shown in FIGS. 2-4, the drum drive system 120 includes a pump, shown as pump 122; a reservoir, shown as fluid reservoir 124, fluidly coupled to the pump 122; and an actuator, shown as drum motor 126. As shown in FIGS. 3 and 4, the pump 122 and the drum motor 126 are fluidly coupled. According to an exemplary embodiment, the drum motor 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum motor 126.

According to an exemplary embodiment, the pump 122 is a variable displacement hydraulic pump (e.g., an axial piston pump, etc.) and has a pump stroke that is variable. The pump 122 may be configured to provide hydraulic fluid at a flow rate that varies based on the pump stroke (e.g., the greater the pump stroke, the greater the flow rate provided to the drum motor 126, etc.). The pressure of the hydraulic fluid provided by the pump 122 may also increase in response to an increase in pump stroke (e.g., where pressure may be directly related to work load, higher flow may result in higher pressure, etc.). The pressure of the hydraulic fluid provided by the pump 122 may alternatively not increase in response to an increase in pump stroke (e.g., in instances where there is little or no work load, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element equal to zero. The pump stroke may increase as the angle of the throttling element increases. According to an exemplary embodiment, the variable pump stroke of the pump 122 provides a variable speed range of up to about 10:1. In other embodiments, the pump 122 is configured to provide a different speed range (e.g., greater than 10:1, less than 10:1, etc.).

In one embodiment, the throttling element of the pump 122 is movable between a stroked position (e.g., a maximum stroke position, a partially stroked position, etc.) and a destroked position (e.g., a minimum stoke position, a partially destroked position, etc.). According to an exemplary embodiment, an actuator is coupled to the throttling element of the pump 122. The actuator may be positioned to move the throttling element between the stroked position and the destroked position. In some embodiments, the pump 122 is configured to provide no flow, with the throttling element in a non-stroked position, in a default condition (e.g., in response to not receiving a stroke command, etc.). The throttling element may be biased into the non-stroked position. In some embodiments, the drum control system 150 is configured to provide a first command signal. In response to receiving the first command signal, the pump 122 (e.g., the throttling element by the actuator thereof, etc.) may be selectively reconfigured into a first stroke position (e.g., stroke in one direction, a destroked position, etc.). In some embodiments, the drum control system 150 is configured to additionally or alternatively provide a second command signal. In response to receiving the second command signal, the pump 122 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

As shown in FIG. 4, the concrete mixing truck 10 includes a power takeoff unit, shown as power takeoff unit 32, that is coupled to the transmission 18. In another embodiment, the power takeoff unit 32 is coupled directly to the engine 16. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 4, the power takeoff unit 32 is selectively coupled to the pump 122 with a clutch 34. In other embodiments, the power takeoff unit 32 is directly coupled to the pump 122 (e.g., without clutch 34, etc.). In some embodiments, the concrete mixing truck 10 does not include the clutch 34. By way of example, the power takeoff unit 32 may be directly coupled to the pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the pump 122. In one embodiment, the actuator includes a solenoid that is electronically actuated according to a clutch control strategy. When the clutch 34 is disengaged, the pump 122 is not coupled to (i.e., is isolated from) the output of the transmission 18. Relative movement between the clutch discs or movement between the clutch discs and another component of the power takeoff unit 32 may be used to decouple the pump 122 from the transmission 18.

In one embodiment, energy flows along a second power path defined from the engine 16, through the transmission 18 and the power takeoff unit 32, and into the pump 122 when the clutch 34 is engaged. When the clutch 34 is disengaged, energy flows from the engine 16, through the transmission 18, and into the power takeoff unit 32. The clutch 34 selectively couples the pump 122 to the engine 16, according to an exemplary embodiment. In one embodiment, energy along the first flow path is used to drive the wheels 22 of the concrete mixing truck 10, and energy along the second flow path is used to operate the drum drive system 120 (e.g., power the pump 122, etc.). By way of example, the clutch 34 may be engaged such that energy flows along the second flow path when the pump 122 is used to provide hydraulic fluid to the drum motor 126. When the pump 122 is not used to drive the mixing drum 102 (e.g., when the mixing drum 102 is empty, etc.), the clutch 34 may be selectively disengaged, thereby conserving energy. In embodiments without clutch 34, the mixing drum 102 may continue turning (e.g., at low speed) when empty.

The drum motor 126 is positioned to drive the rotation of the mixing drum 102. According to an exemplary embodiment, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of the pump 122 and the speed range of the drum motor 126. The drum drive system 120 having the pump 122 and the drum motor 126 may thereby have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the pump 122 and the drum motor 126 may not have to be operated at displacement extremes to meet the speed requirements for the mixing drum 102 during various applications, but can rather be modulated to the most efficient working conditions (e.g., by the drum control system 150, etc.).

As shown in FIG. 2, the drum drive system 120 includes a drive mechanism, shown as drum drive wheel 128, coupled to the mixing drum 102. The drum drive wheel 128 may be welded, bolted, or otherwise secured to the head of the mixing drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixing drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixing drum 102. By way of another example, the drum motor 126 (e.g., an output thereof, etc.) may be directly coupled to the mixing drum 102 (e.g., along the axis 104, etc.) to rotate the mixing drum 102.

According to an exemplary embodiment, the speed of the mixing drum 102 is directly proportional to the speed of the drum motor 126 (e.g., based on gearing, pulley, etc. arrangement between the drum motor 126 and the drum drive wheel 128, etc.). The speed of the mixing drum 102 may be represented by following expression:

$$N_d \propto N_m = \frac{Q}{Dsp_m} \quad (1)$$

where $N_d$ is the speed of the mixing drum 102, $N_m$ is the speed of the drum motor 126, Q is the hydraulic fluid flow provided to the drum motor 126 by the pump 122, and $Dsp_m$ is the displacement of the drum motor 126. In a drum drive system where the drum actuator is a fixed displacement motor, the motor displacement is a constant and the speed of the drum motor 126, and thereby the speed of the mixing drum 102, is based solely on the hydraulic fluid flow provided by the pump 122. Advantageously, the drum drive system 120 of the present disclosure includes a variable displacement drum motor 126 such that the speed of the mixing drum 102 is based on the hydraulic fluid flow provided by the pump 122 and the displacement of the drum motor 126.

The hydraulic fluid flow provided by the pump 122 to the drum motor 126 may be represented by the following expression:

$$Q = N_p \cdot Dsp_p \quad (2)$$

where $N_p$ is the speed of the pump 122 and $Dsp_p$ is the displacement of the pump 122. Since the pump 122 is driven by the engine 16 with the power takeoff unit 32, the speed of the pump 122 is proportional to the speed of the engine 16 (e.g., approximately a 1:1 ratio, etc.), and thereby the hydraulic fluid flow is proportional to the speed of the engine 16. A pump with higher displacement will provide more flow. However, increasing the displacement of a pump increases the size, weight, and cost thereof. Larger pumps also have a much lower allowable working speed because of the eccentric force from the increase in mass. Typically, the smallest pump to meet the work requirement is selected and the engine is typically operated at the high idle when high drum speed is needed. However, this leads to various disadvantageous such unnecessary fuel consumption, more emissions, increased noise, reduced engine life, etc. The drum motor 126 having variable displacement alleviates the aforementioned disadvantages of a drum drive system having a fixed displacement motor.

According to an exemplary embodiment, the drum motor 126 has a torque capacity that is capable of meeting the most severe work load experienced by the drum assembly 100. The torque capacity of the drum motor 126 may be represented by the following expression:

$$T_m = Dsp_m \cdot P_Q \quad (3)$$

where is the torque of the drum motor 126 and $P_Q$ is the pressure of the hydraulic fluid flow provided to the drum motor 126 by the pump 122. A similar expression may be used to represent the torque capacity of the pump 122. The pump 122 and the drum motor 126 may have a threshold working pressure (e.g., 5000 pounds-per-square-inch ("psi"), etc.). The energy required to operate the mixing drum 102 at a certain speed may be represented by the following expression:

$$HP = N_m \cdot T_m = P_Q \cdot Q \qquad (4)$$

where HP is the horsepower of the drum drive system 120.

The most severe workloads appear when the mixing drum 102 is in acceleration, braking, and/or discharging (e.g., where the speed of the mixing drum 102 is in low to medium range, etc.). In a loading mode or a mixing mode, the speed of the mixing drum 102 is high but stable. The torque required for the loading and mixing modes is typically less than half of the most severe loads. During low speed and high torque conditions, the drum motor 126 may be configured to operate in a large displacement setting to provide the required torque. In a high speed but relative stable torque condition, the drum motor 126 may be configured to operate at a reduced displacement so as to require less flow for the same rotating speed. Then, the speed of the pump 122, and thereby the speed of the engine 16 may be reduced.

By way of example, during an initial stage of operation, the drum motor 126 may be operated at 100% displacement and the system pressure may be at 2000 psi. The pump 122 may also be operated at 100% displacement. The engine may be operated at a high idle speed of 2000 rpm. Now, if the displacement of the drum motor 126 is reduced to 50% of the maximum amount of displacement, only half of the original hydraulic flow is needed to maintain the same motor speed, based on Equation (1). However, because the mixing drum 102 is still running with the same load at the same speed, the horsepower consumption will not change. From Equation (4), the system pressure will double with the same horsepower consumption and half the hydraulic fluid flow. Therefore, the system pressure will increase to 4000 psi from the original 2000 psi. Further, now that half of the original amount of hydraulic fluid flow is required, the pump 122 may be operated at half of the original speed thereof with the full displacement setting, based on Equation (2). As a result, the engine 16 may be operated at half of the high idle speed (e.g., 1000 rpm instead of 2000 rpm, etc.) since the speed of the pump 122 is proportional to the speed of the engine 16. Therefore, the drum drive system 120 is capable of providing the same horsepower output while at significantly lower engine speeds, which provides much better fuel efficiency, less emissions, decreased operational noise, increased engine life, etc.

By way of another example, concretes may not always be low slump heavy materials. With high slump light concrete, the drum work load can be much lighter. The system pressure may only be at 1500 psi with the drum motor 126 at full displacement. The motor displacement can be further decreased to less than 50%, for example 40%. The system pressure may only be 3750 psi (e.g., which is less than the maximum allowable system pressure, etc.). Then, the engine 16 may be operated at a low idle speed (e.g., 800 rpm, etc.).

According to the exemplary embodiment shown in FIG. 3, the drum control system 150 for the drum assembly 100 of the concrete mixing truck 10 includes a controller, shown as drum assembly controller 152. In one embodiment, the drum assembly controller 152 is configured to selectively engage, selectively disengage, control, and/or otherwise communicate with components of the drum assembly 100 and/or the concrete mixing truck 10 (e.g., actively control the components thereof, etc.). As shown in FIG. 3, the drum assembly controller 152 is coupled to the engine 16, the pump 122, the drum motor 126, a first pressure sensor 154, a second pressure sensor 156, and a speed sensor 158. The pump 122 is coupled to the engine 16 (e.g., by way of a PTO connection on a transmission of the concrete mixing truck 10, etc.). In other embodiments, the drum assembly controller 152 is coupled to more or fewer components. The drum assembly controller 152 may be configured to regulate the speed of the engine 16, the displacement of the pump 122, and/or the displacement of the drum motor 126 to provide a target speed (e.g., received from an operator, etc.) of the mixing drum 102. By way of example, the drum assembly controller 152 may send and receive signals with the engine 16, the pump 122, the drum motor 126, the first pressure sensor 154, the second pressure sensor 156, and/or the speed sensor 158.

The drum assembly controller 152 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the drum assembly controller 152 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the drum assembly controller 152 is configured to regulate the engine speed, the pump displacement, and the motor displacement to provide a target drum speed, while maintaining the engine speed at a lowest possible level while using pump and motor displacement changes to achieve the target hydraulic fluid flow and hydraulic power demand. The control of the drum speed can be achieved by using a target drum speed error to calculate the pump and motor displacement changes with minor or no changes to the engine speed through a proportional-integral-derivative ("PID") based control strategy. A look-up table based or gain-scheduling, or other forms of control strategies can also be used to adjust the pump and motor displacement independently. In some embodiments, the drum assembly controller 152 is configured to operate the engine 16 at the lowest possible engine speed, the pump 122 at the lowest possible pump displacement, and the drum motor 126 at the highest possible motor displacement to achieve the target drum speed within constraints such as maximum hydraulic pressure, maximum engine torque/load, and maximum drum speed. To facilitate such control, the drum control system is configured to monitor (i) the working pressure of the hydraulic fluid flow on both sides of the drum motor 126 and the pump 122 with the first pressure sensor 154 and the second pressure sensor 156, (ii) the speed of the drum motor 126 with the speed sensor 158 (i.e., which is proportional to the speed of the mixing drum 102), (iii) the speed of the engine 16, (iv) the torque of the engine 16, and/or (v) a percent load on the drum drive system 120. Further details regarding a control strategy implemented by the drum assembly controller 152 are provided herein in relation to method 500. In other embodiments, the drum control system 150 does not employ pressure feedback control (e.g., employs open loop control, controls based on other feedbacks, hydraulic components with higher pressure operating conditions are employed, etc.). In still other embodiments, the drum control system 150 is configured to adjust the displacement of the drum motor 126 in response to at least one of (i) a torque of the engine 16, (ii) a load on the engine 16, and (iii) a power of the engine 16. In yet other embodiments, the drum control system is configured to adjust the displacement of the drum motor 126 in response to at least one of (i) a torque of the engine 16 and (ii) a torque of the pump 122 and a displacement of the pump 122.

Figure 5:
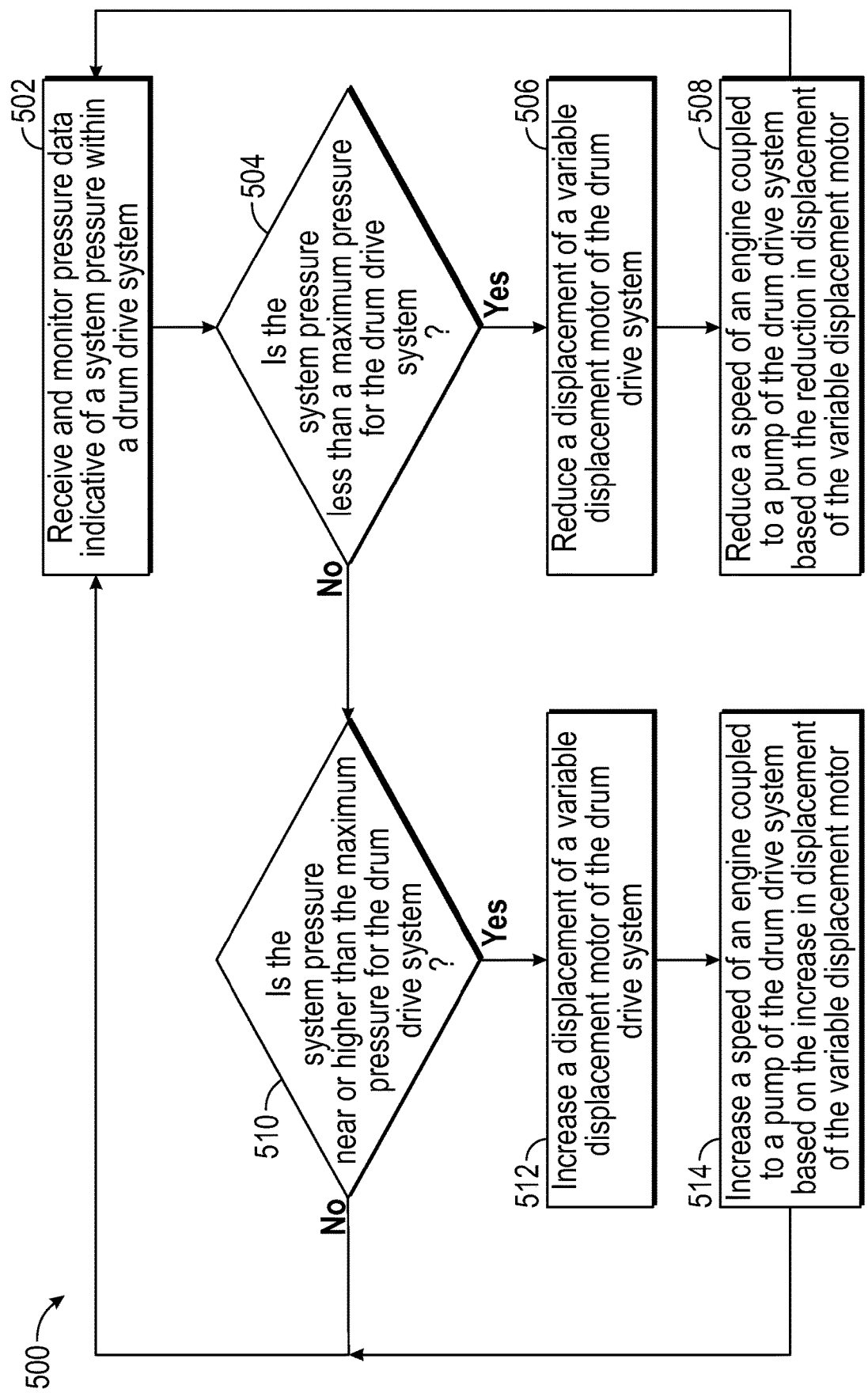
FIG. 5 is a flow diagram of a method for controlling a drum drive system having a variable displacement pump and a variable displacement motor, according to an exemplary embodiment.

Referring now to FIG. 5, a method 500 for controlling a drum drive system having a variable displacement pump and a variable displacement motor to provide a target drum speed by modulating engine speed, pump displacement, and motor displacement, is shown according to an exemplary embodiment. The method may include maintaining the engine speed at the lowest required level while actively controlling pump displacement and motor displacement to provide the required power demand to operate the drum at the target drum speed.

At step 502, a control system (e.g., the drum control system 150, the drum assembly controller 152, etc.) is configured to receive and monitor pressure data indicative of a system pressure (e.g., pressure of the hydraulic fluid flow, etc.) within a drum drive system (e.g., the drum drive system 120, etc.) from at least one pressure sensor (e.g., the first pressure sensor 154, the second pressure sensor 156, etc.). At step 504, the control system is configured to determine whether the system pressure is less than a maximum or threshold pressure (e.g., 5000 psi, etc.) for the drum drive system. If the system pressure is less than the maximum or threshold pressure (e.g., by more than a threshold difference, etc.), the control system is configured to proceed to step 506.

At step 506, the control system is configured to reduce a displacement of a variable displacement motor (e.g., the drum motor 126, etc.) of the drum drive system in response to the system pressure being less than the maximum or threshold pressure. At step 508, the control system is configured to reduce a speed of an engine (e.g., the engine 16, etc.) coupled to a pump (e.g., the pump 122, etc.) of the drum drive system based on the reduction in displacement of the variable displacement motor (e.g., if the speed of the engine is not at idle, unless the transmission of the vehicle is in drive and is then independently controlled based on vehicle driving needs, etc.). The control system may then return to step 502 to further reduce the speed of the engine, if possible. If the system pressure is not less than a maximum or threshold pressure (e.g., 5,000 psi, etc.) for the drum drive system, the control system is configured to determine, at step 510, whether the system pressure is at or near the maximum or threshold pressure for the drum drive system. If the system pressure is at or near the maximum or threshold pressure for the drum drive system, the control system is configured to increase a displacement of a variable displacement motor of the drum drive system at step 512 and increase a speed of an engine coupled to a pump of the drum drive system based on the increase in displacement of the variable displacement motor at step 514 and thereafter return to step 502.

According to an exemplary embodiment, reducing the displacement of the variable displacement motor will generate a higher system pressure. By way of example, reducing the displacement of the variable displacement motor requires less fluid flow to maintain the same speed of the variable displacement motor, and thereby maintain the speed of the drum (e.g., see Equation (1), etc.). However, because the drum needs to continue running with the same load at the same speed, the horsepower consumption to drive the drum does not change. With the same horsepower consumption and a reduced fluid flow, the system pressure will increase (e.g., see Equation (4), etc.). With the fluid flow reduced, the pump may be operated by the control system at a reduced speed while maintaining the current displacement setting thereof (e.g., see Equation (2), etc.). Since the speed of the pump is proportional to the speed of the engine, the control system may operate the engine at a reduced speed. Therefore, control system is configured to control the engine, the pump, and the motor to provide the same horsepower output and drum speed while at significantly lower engine speeds, which may provide increased fuel efficiency, reduced emissions, decreased operational noise, increased engine life, etc.

Figure 6:
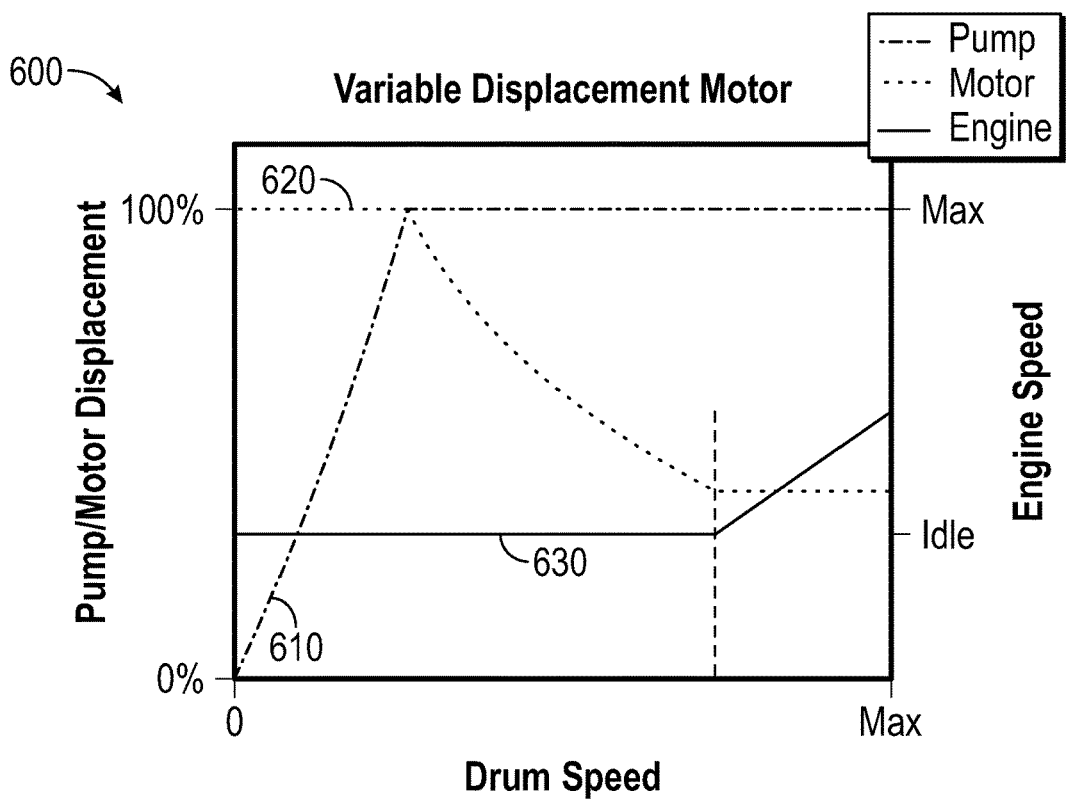
FIG. 6 is a control strategy plot outlining (i) pump displacement versus drum speed, (ii) motor displacement versus drum speed, and (iii) engine speed versus drum speed, according to an exemplary embodiment.
Figure 7:
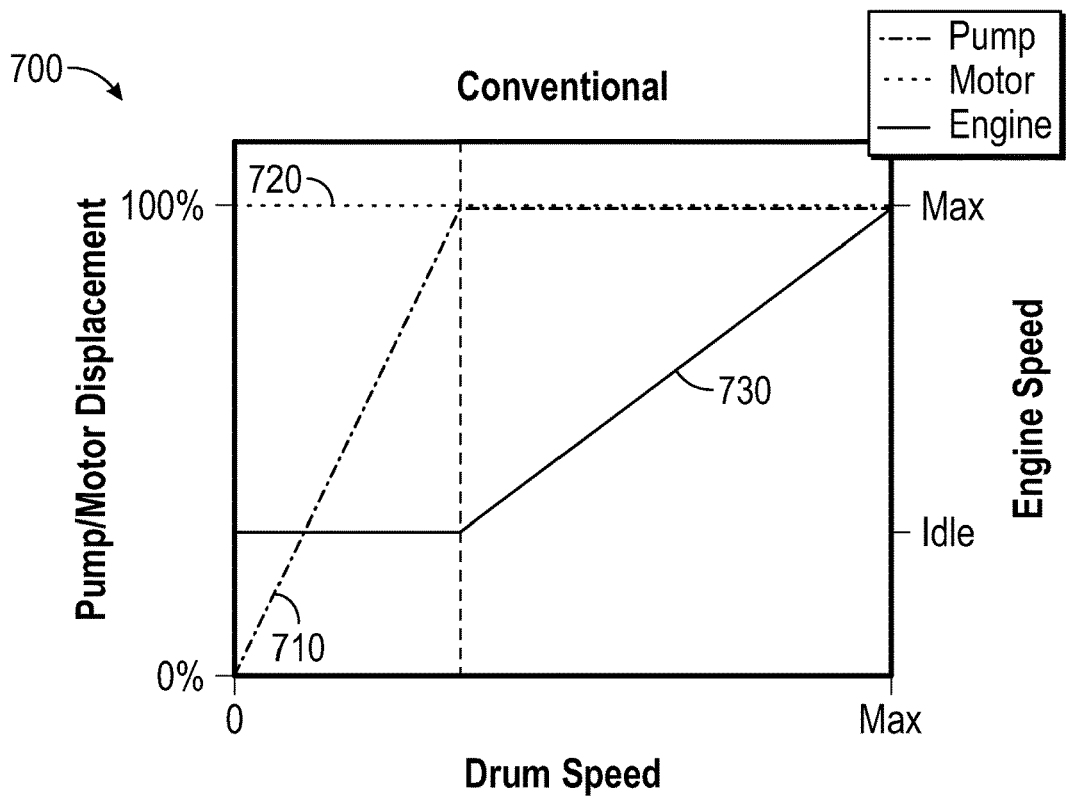
FIG. 7 is a conventional control strategy plot outlining pump displacement versus drum speed, (b) motor displacement versus drum speed, and (c) engine speed versus drum speed.

In still another embodiment, the pump displacement, the motor displacement, and the engine speed are controlled as shown in FIG. 6. FIG. 7 shows one exemplary traditional control scheme for comparison purposes. According to one embodiment, an increasing drum speed command (e.g., for a drum drive system having a fixed displacement motor, etc.) for one or more target drum speeds, for a decreasing drive ratio, etc.) includes several stages of control: (i) the pump displacement is increased and/or set to achieve a target drum speed at a current engine speed (e.g., a speed that may be uncontrolled such as when driving, etc.) and maximum motor displacement, (ii) the variable motor displacement is decreased to achieve the target drum speed at the maximum pump displacement and the current engine speed, and (iii) increase engine speed to achieve the target drum speed at maximum pump displacement and a minimum motor displacement. The third control state may be executed only when possible (e.g., the vehicle is not driving, the transmission 18 thereof is in neutral such that the vehicle drive system 20 is not being driven, etc.). As shown in FIGS. 6 and 7, the graphs 600 and 700 include exemplary plots for (i) the relationship between pump displacement versus drum speed (610 and 710), (ii) the relationship between motor displacement versus drum speed (620 and 720), and (iii) the relationship between engine speed versus drum speed (630 and 730). The minimum motor displacement may be limited (e.g., during the second stage of control, etc.) based on at least one of a target hydraulic pressure (e.g., differential, gauge, absolute, etc.), a maximum hydraulic pressure engine load, engine torque, pump torque, motor torque, etc. The minimum motor displacement may additionally or alternatively be limited based on a mechanical or software lower threshold. The engine speed may be limited (e.g., during the third stage of control, etc.) based on at least one of engine load, engine torque, pump torque, motor torque, hydraulic pressure, etc. Engine speed control may be employed after motor displacement control and pump displacement control have been utilized. The motor displacement may be kept as high as possible until necessary for speed control (e.g., and improve component durability, etc.). The order of control used to achieve a given speed may include, by way of example, increasing pump displacement until it is at a maximum, then decreasing motor displacement until it is at the minimum threshold (e.g., acceptable, etc.) level, and thereafter increasing engine speed until the target drum speed is achieved.

The control system of the present disclosure may address three constraints that could otherwise impact performance (e.g., reduce or prevent the ability to achieve or maintain the desired combination motor displacement, pump displacement, and engine speed, etc.). By way of example, engine speed may be controllable only when the vehicle is not being driven (e.g., the transmission of the vehicle is in a neutral gear, etc.). By way of another example, the engine may not be configured to provide the required power at a low speed (e.g., a low idle speed, the lowest possible speed, the lowest desired speed, etc.). By way of yet another example, the hydraulic system may be configured to operate below a threshold pressure (e.g., to maintain component durability, etc.). The control system of the present disclosure may monitor engine power by evaluating percent load. In response to the engine percent loading exceeding a threshold level (e.g., 80%, etc.), the controller may be configured to increase engine speed and increase motor displacement to provide a desired drum speed (e.g., to prevent the engine from stalling, etc.). The controller may be configured to preemptively increase the engine speed for elevated drum speeds (e.g., reducing or limiting the prevalence of system "hunting" of engine speed, which may be much more noticeable than valve hunting due to engine noise changes). The control system of the present disclosure may monitor hydraulic pressure (e.g., differential, gauge, absolute, maximum, etc.). In one embodiment, the controller is configured to lower the pressure in response to the pressure exceeding a threshold level (e.g., 4,500 psi, etc.) by increasing motor displacement and increasing engine speed to maintain the desired drum speed. The controller may be configured to preemptively increase the engine speed for elevated drum speeds (e.g., reducing or limiting the prevalence of system "hunting" of engine speed, which may be much more noticeable than valve hunting due to engine noise changes).

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle comprising:
an engine;
a transmission coupled to the engine;
a drum configured to mix drum contents received therein;
a drum drive system coupled to the drum and the engine, the drum drive system including:
a pump mechanically coupled to the engine such that a pump speed of the pump is based on a speed of the engine, the pump configured to pump a fluid through a hydraulic system, the pump having a variable pump displacement; and
a motor fluidly coupled to the pump by the hydraulic system such that a motor speed of the motor is based on a flow of the fluid received from the pump, the motor positioned to drive the drum to agitate the drum contents, the motor having a variable motor displacement;
a pressure sensor positioned along the hydraulic system between the pump and the motor to acquire pressure data indicative of a pressure of the fluid within the hydraulic system; and
a control system coupled to the pressure sensor, the engine, and the drum drive system, the control system configured to:
operate the engine, the motor, and the pump to drive the drum;
receive the pressure data from the pressure sensor; and
in response to the pressure of the fluid being below a threshold pressure and the transmission being in neutral, and while maintaining a speed of the drum:
reduce the variable motor displacement of the motor
reduce the speed of the engine, which thereby decreases the pump speed of the pump; and
increase the variable pump displacement of the pump.

2. The vehicle of claim 1, wherein the control system is configured to manipulate the speed of the engine while the transmission of the vehicle is in neutral, and wherein the control system is configured to permit the speed of the engine to vary independent of the speed of the drum while the transmission of the vehicle is not in neutral.

3. The vehicle of claim 1, wherein the drum drive system is capable of providing an overall drive ratio between 30:1 and 40:1, the overall drive ratio being a product of a pump speed range of the pump and a motor speed range of the motor, the pump speed range being a ratio of a maximum pump displacement to a minimum pump displacement of the pump, and the motor speed range being a ratio of a maximum motor displacement to a minimum motor displacement of the motor.

4. The vehicle of claim 3, wherein the pump has the pump speed range of about 10:1.

5. The vehicle of claim 4, wherein the motor has the motor speed range of about 3:1.

6. The vehicle of claim 4, wherein the motor has the motor speed range of about 4:1.

7. The vehicle of claim 1, wherein the control system is configured to:

increase the variable motor displacement of the motor in response to the pressure of the fluid being at or greater than the threshold system pressure; and
increase the speed of the engine based on the increase in the variable motor displacement, while maintaining the speed for the drum.

8. The vehicle of claim 1, wherein the control system is configured to maintain the speed of the engine and not decrease the speed of the engine if at an idle speed of the engine.

9. The vehicle of claim 1, wherein the control system is configured to control the speed of the engine independent of the speed of the drum while maintaining the speed of the drum if the transmission is in gear and the engine is driving the vehicle.

10. The vehicle of claim 1, wherein the control system is configured to initially operate (i) the motor at a maximum motor displacement and (ii) the engine and the pump at a lowest possible engine speed and a lowest possible pump displacement, respectively, that achieves the speed of the drum.

11. The vehicle of claim 1, wherein, in response to the pressure of the fluid being at or above the threshold pressure and the transmission being in neutral, and while maintaining the speed of the drum, the control system is configured to:
increase the speed of the engine, which thereby increases the pump speed of the pump;
decrease the variable pump displacement of the pump; and
increase the variable motor displacement of the motor.

12. The vehicle of claim 1, wherein the control system is configured to increase the speed of the engine in response to (i) the variable pump displacement reaching a maximum pump displacement of the pump and (ii) the variable motor displacement reaching a minimum motor displacement of the motor to achieve an increased speed.

13. A vehicle comprising:
an engine;
a mixing drum;
a drum drive system including:
a variable displacement pump selectively mechanically couplable to the engine such that a pump speed of the variable displacement pump is based on an engine speed of the engine; and
a variable displacement motor fluidly coupled to the variable displacement pump such that a motor speed of the variable displacement motor is based on a flow of a fluid received from the variable displacement pump, wherein the variable displacement motor is configured to drive the mixing drum at a target drum speed; and
a controller configured to selectively control the engine, the variable displacement pump, and the variable displacement motor to provide the target drum speed, wherein the target drum speed is based on an input from an operator of the vehicle, and wherein to provide the target drum speed, the controller is configured to:
(i) initially operate the variable displacement motor at a maximum motor displacement and operate the variable displacement pump at a pump displacement that provides the target drum speed without needing to actively manipulate the engine speed;
(ii) increase the pump displacement and decrease a motor displacement without needing to actively manipulate the engine speed while still providing the target drum speed; and (iii) increase the engine speed in response to the pump displacement reaching a maximum pump displacement and the motor displacement reaching a minimum motor displacement if necessary to maintain the target drum speed.

14. The vehicle of claim 13, wherein the drum drive system is capable of providing an overall drive ratio between 30:1 and 40:1, the overall drive ratio being a product of a pump speed range of the variable displacement pump and a motor speed range of the variable displacement motor, the pump speed range being a ratio of the maximum pump displacement to a minimum pump displacement of the variable displacement pump, and the motor speed range being a ratio of the maximum motor displacement to the minimum motor displacement of the variable displacement motor.

15. The vehicle of claim 14, wherein the variable displacement pump has the pump speed range of 10:1.

16. The vehicle of claim 15, wherein the variable displacement motor has the motor speed range of 3:1 or 4:1.

17. The vehicle of claim 13, further comprising a transmission, wherein the engine speed can be actively manipulated if the transmission is in neutral.

18. The vehicle of claim 13, further comprising a transmission, wherein the engine speed is increased if the transmission is in neutral.

* * * * *